April 17, 1951 H. W. GRAYBROOK ET AL 2,549,304
CONTROL SYSTEM
Filed May 7, 1946
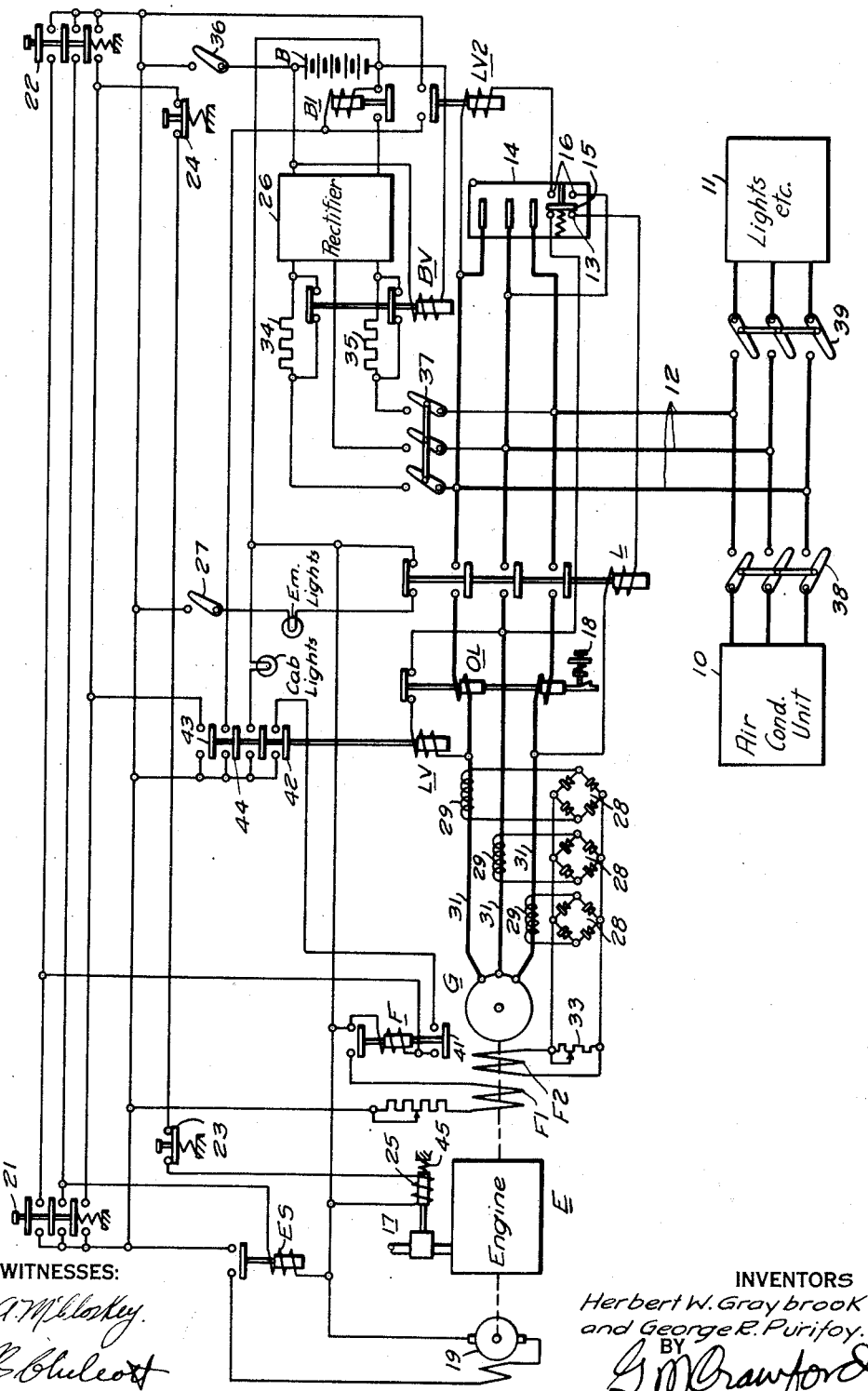
WITNESSES:
E. A. M'Closkey.
N. B. Chilcott
INVENTORS
Herbert W. Graybrook
and George R. Purifoy.
BY
G. M. Crawford
ATTORNEY

UNITED STATES PATENT OFFICE 2,549,304

CONTROL SYSTEM

Herbert W. Graybrook, Irwin, and George R. Purifoy, Pittsburgh, Pa., assignors to Westinghouse Electric Corporation, East Pittsburgh, Pa., a corporation of Pennsylvania Application May 7, 1946, Serial No. 667,765

5 Claims. (Cl. 175—294)

Our invention relates, generally, to control systems and, more particularly, to systems for controlling the operation of auxiliary power sources for railway passenger cars and the like.

A relatively large amount of alternating current power is required to operate the air conditioning units, air cleaning devices, fluorescent lights, water coolers, radios, etc. with which modern railway passenger cars are or will be equipped. It is desirable that this equipment operate continuously while a car is in service, therefore the power supply for individual cars should be reliable. Also, provision should be made for utilizing power from central stationary sources when available, as when a car is lying at a terminal or junction point.

An object of our invention, generally stated, is to provide a control system for auxiliary power sources which shall be simple and efficient in operation and which may be economically manufactured and installed.

A more specific object of our invention is to provide a self-regulating alternating current generator for an auxiliary power plant.

Another object of our invention is to protect the generator of an auxiliary power plant from injury when power is obtained from another source.

A further object of our invention is to provide overload protection for the engine and generator of an auxiliary power plant. Other objects of our invention will be explained fully hereinafter or will be apparent to those skilled in the art.

In accordance with one embodiment of our invention, a self-regulating alternating current generator, which is driven by a Diesel engine, supplies power for operating the air conditioning and other apparatus on a railway car. When wayside power is utilized the generator is automatically disconnected. The engine is automatically stopped in case of an overload or short circuit on the generator. Emergency power is supplied by a battery when required.

For a fuller understanding of the nature and objects of our invention, reference may be had to the following detailed description, taken in conjunction with the accompanying drawing, in which the single figure is a diagrammatic view of a control system embodying the principal features of our invention.

Referring to the drawing, the system shown therein comprises a three-phase generator G which is driven by an engine E and is utilized to supply power for operating an air conditioning unit 10 and other apparatus such as lights, water coolers, radios, etc. designated by the reference numeral 11. The generator G may be connected to power conductors 12 by a switch L, the actuating coil of which is connected across one phase of the generator G, through contact members 13 which are disposed in a receptacle 14 provided for connecting the power conductors 12 to an outside source of power when the car is at a terminal or junction point on the railway system.

As shown the contact members 13 are bridged by a member 15 when the lid of the receptacle 14 is closed. When the lid of the receptacle is opened to insert a connector for connecting conductors 12 to an outside source of power, the member 15 bridges contact members 16, thereby connecting the actuating coil of a relay LV2 across one phase of the power conductors 12.

As shown, the actuating coil of a relay LV is connected across one phase of the generator G through normally closed contact members of an overload relay OL. The overload relay OL is provided with two coils each one of which is connected in a phase of the generator G. When the generator current exceeds a predetermined amount, the overload relay OL operates to open its contact members thereby deenergizing the relay LV which in turn opens its contact members to stop the engine E, by closing a fuel shut-off valve 17. The opening of the contact members of the relay LV also deenergizes a switch F which disconnects a field winding F1 of the generator G from a battery B. In this manner the generator G is protected from injury by overloads and it is necessary to reset the overload relay OL by releasing a spring-biased latch 18.

The engine E may be started by means of a starting motor 19 which is connected across the battery B through the contact members of a switch ES, the actuating coil of which may be connected across the battery B by means of either one of two push button switches 21 and 22. The engine may be stopped at any time by opening either one of two push button switches 23 and 24 which will deenergize the actuating coil 25 of the fuel valve 17.

A rectifier 26 is provided for charging the battery B from power supplied either by the generator G or from an outside source when the receptacle 14 is connected to a suitable source of alternating-current power. A switch B1 is provided in the circuit between the rectifier 26 and the battery B. The actuating coil of the switch B1 is connected across the battery B through either the contact members of the relay LV2 or contact members of the relay LV.

Thus, it is necessary for the relay LV to be energized by the generator G or for the relay LV2 to be energized by an outside source of power in order to maintain the switch B1 closed to connect the battery B to the rectifier 26. In this manner the battery B cannot discharge through the rectifier 26 when the engine is shut down and the receptacle 14 is not connected to an outside source of power. If desired, the emergency lights can be extinguished by opening a switch 27 to disconnect the emergency lights from the battery B.

Two rates of charging the battery by the rectifier 26 are provided by means of resistors 34 and 35 and a relay BV, the actuating coil of which is connected across the terminals of the battery B. If the battery is slightly discharged, the charger will operate at the high rate until the battery voltage is sufficient to cause the relay BV to open its contact members to insert the resistors 34 and 35 in the rectifier circuits, thereby reducing the charging rate to a trickle charge.

In order to simplify the operation of the generator G, it is made self-regulating. This is accomplished by exciting the main field F1 through an adjustable resistor from the battery B and exciting an auxiliary field F2 by means of rectified current from rectifiers 28 which are connected to current transformers 29 disposed in the power leads 31 from the generator G. Since the current in the secondary winding of the current transformer 29 is proportional to the load current of the generator, the current from the rectifiers 28 varies with the load on the generator, thereby regulating the excitation of the generator. The excitation current in the auxiliary field winding F2 may be controlled by adjusting a variable rheostat 33 which is connected across the field winding F2 so as to shunt out part of the amperes supplied by the rectifiers 28. When once adjusted to provide the proper excitation for normal generator load current, there should be no need for further servicing of the generator regulating system.

Assuming it is desired to start the engine, a switch 36 may be closed to connect the battery B to the control circuits and switches 37, 38 and 39 are closed to connect the power conductors 12 to the rectifier 26, the air conditioning unit 10 and the lighting circuits, etc. 11, respectively. The engine may be started by closing either one of the push buttons 21 or 22, thereby closing the switch ES to energize the starting motor 19. The closing of the starting push button also energizes the solenoid 25 to open the fuel valve 17, and energizes the actuating coil of the switch F to connect the field winding F1 across the battery B.

When the engine fires and comes up to speed, the switch L is closed by the voltage developed by the generator. The closing of the switch L connects the generator to the load circuit 12. The relay LV will also close, thereby lighting the cab lamps and at the same time establishing a holding circuit for the switch F through contact members 41 on the switch F and 42 on the relay LV. A holding circuit for the solenoid coil 25 of the fuel valve 17 is also provided through contact members 43 of the relay LV.

When the cab lamps light, the starting push button can be released, thus opening the circuit for the starting motor 19. The closing of the relay LV also establishes a circuit from the battery to the charging rectifier 26 by energizing the actuating coil of the switch B1 through contact members 44 of the relay LV. If it is desired to stop the engine, either one of the push buttons 23 or 24 may be opened to deenergize the solenoid 25 of the fuel valve 17.

In the event of an overload or short circuit, the overload relay OL functions and deenergizes the actuating coil of the relay LV which opens its contact members to stop the engine by deenergizing the solenoid 25, thereby permitting the fuel valve 17 to be closed by a spring 45.

If the air conditioning or lighting loads are to be supplied from an outside source of power the circuits are so interlocked that the power from the generator G is shut off when the wayside connection is plugged in through the receptacle 14, as explained hereinbefore. The opening of the lid of the receptacle 14 causes the deenergization of the switch L, thereby disconnecting the generator from the power conductors 12. When the wayside connection is plugged into the receptacle, the actuating coil of the relay LV2 is energized thereby causing the switch B1 to be closed to permit the battery B to be charged from the outside power source through the rectifier 26.

From the foregoing description it is apparent that we have provided a system for controlling the operation of an engine driven generator which may be utilized to supply power for operating equipment on railway passenger cars, or other vehicles, which may be also supplied with power from outside sources under certain conditions. The present system protects the generator from danger when the outside source of power is utilized. Furthermore, the load cannot be connected to the generator until its voltage is up to its normal value. The generator is also fully protected against overload or short circuit conditions.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system, in combination, a generator, an engine for driving the generator, a load circuit, switching means for connecting the generator to the load circuit, relay means having an actuating coil energized by the generator voltage, overload protective means for controlling the energization of said coil, means controlled by said relay means for stopping said engine, said switching means being operable independently of said overload protective means, and said relay means being mechanically independent of the overload protective means.

2. In a control system, in combination, a generator, an engine for driving the generator, a load circuit, switching means responsive to the generator voltage for connecting the generator to the load circuit, relay means having an actuating coil energized by the generator voltage, overload protective means for controlling the energization of said coil, means controlled by said relay means for stopping said engine, said switching means being operable independently of said overload protective means, and said relay means being mechanically independent of the overload protective means.

3. In a control system, in combination, a generator, an engine for driving the generator, a load circuit, switching means for connecting the generator to the load circuit, a relay responsive to the generator voltage, means controlled by said relay for stopping the engine, overload protective means for controlling the energization of said relay, said switching means being operable independently of said overload protective means, and said relay being mechanically independent of the overload protective means.

4. In a control system, in combination, a generator, an engine for driving the generator, a load circuit, switching means responsive to the generator voltage for connecting the generator to the load circuit, a relay responsive to the generator voltage, means controlled by said relay for stopping the engine, overload protective means for controlling the energization of said relay, said switching means being operable independently of said overload protective means, and said relay being mechanically independent of the overload protective means.

5. In a control system, in combination, a generator, an engine for driving the generator, a load circuit, switching means responsive to the generator voltage for connecting the generator to the load circuit, overload protective means, a relay responsive to the generator voltage, valve means for stopping the engine, said overload protective means controlling the energization of said relay to control the operation of said valve means, said switching means being operable independently of said overload protective means, and said relay being mechanically independent of the overload protective means.

HERBERT W. GRAYBROOK.
GEORGE R. PURIFOY.

REFERENCES CITED

The following references are of record in the file of this patent:

UNITED STATES PATENTS

| Number | Name | Date |
|---|---|---|
| 583,173 | Emery | May 25, 1897 |
| 856,476 | Laird and Todd | June 11, 1907 |
| 1,425,755 | Deutsch | Aug. 15, 1922 |
| 1,524,562 | Kuyser | Jan. 29, 1925 |
| 1,641,691 | Pohl | Sept. 6, 1927 |
| 1,641,755 | Pohl | Aug. 15, 1927 |
| 1,792,240 | Ray | Feb. 10, 1931 |
| 1,825,526 | Kamada | Sept. 29, 1931 |
| 1,900,589 | Seeley | Mar. 7, 1933 |
| 1,989,481 | Kerr | Jan. 29, 1935 |
| 2,003,036 | Callahan | May 28, 1935 |
| 2,032,956 | Seeley | Mar. 3, 1936 |
| 2,196,418 | Kintzing | Apr. 9, 1940 |
| 2,246,139 | Lundstrom | June 17, 1941 |
| 2,254,724 | Bany et al. | Sept. 2, 1941 |
| 2,314,587 | Lillquist | Mar. 23, 1943 |
| 2,344,311 | Laird | Mar. 14, 1944 |
| 2,348,042 | Warren | May 2, 1944 |
| 2,363,833 | Crary | Nov. 28, 1944 |
| 2,378,765 | DeGarr | June 19, 1945 |